(12) United States Patent
Im et al.

(10) Patent No.: US 11,713,543 B2
(45) Date of Patent: Aug. 1, 2023

(54) FIBER COMPRISING THERMOPLASTIC ELASTOMER AND SILICA NANOPARTICLE, STRETCHABLE HYDROPHOBIC FIBER ARTICLE PREPARED THEREWITH, AND METHOD FOR PREPARING THE SAME

(71) Applicant: Soonchunhyang University Industry Academy Cooperation Foundation, Chungcheongnam-do (KR)

(72) Inventors: Jung Kyun Im, Chungcheongnam-do (KR); Jong-Min Lim, Chungcheongnam-do (KR); Da Eun Lee, Seoul (KR); Hye Jin Yang, Gyeonggi-do (KR); Eun Young Choi, Gwangju (KR); Akula S. N. Murthy, Chungcheongnam-do (KR); Tejinder Singh, Chungcheongnam-do (KR)

(73) Assignee: SOONCHUNHYANG UNIVERSITY INDUSTRY ACADEMY COOPERATION FOUNDATION

( * ) Notice: Subject to any disclaimer, the term of this patent is extended or adjusted under 35 U.S.C. 154(b) by 229 days.

(21) Appl. No.: 17/006,337

(22) Filed: Aug. 28, 2020

(65) Prior Publication Data
US 2021/0062410 A1    Mar. 4, 2021

(51) Int. Cl.
*D06M 11/79*    (2006.01)
*C08L 25/06*    (2006.01)
(Continued)

(52) U.S. Cl.
CPC .............. *D06M 11/79* (2013.01); *C08K 3/36* (2013.01); *C08K 5/02* (2013.01); *C08L 25/06* (2013.01);
(Continued)

(58) Field of Classification Search
None
See application file for complete search history.

(56) References Cited

U.S. PATENT DOCUMENTS

2012/0264884 A1*  10/2012  Liu ..................... C09D 153/00
                                                               525/276

FOREIGN PATENT DOCUMENTS

JP          2007196383 A    8/2007
JP    10-2009-0092264 A    8/2009
(Continued)

OTHER PUBLICATIONS

LI et al., "What do we need for a superhydrophobic surface? A review on the recent progress in the preparation of superhydrophobic surfaces", Chem. Soc. Rev., 2007, 36, 1350-1368.
(Continued)

*Primary Examiner* — Arti Singh-Pandey
(74) *Attorney, Agent, or Firm* — Wood, Phillips, Katz, Clark & Mortimer

(57) ABSTRACT

The present disclosure relates to a fiber for manufacturing a stretchable hydrophobic fiber article, the fiber including silica nanoparticles which are surface-modified such that the silica nanoparticles include a hydrocarbon chain, and a styrene-based thermoplastic elastomer, a stretchable hydrophobic fiber article manufactured therefrom, and a manufacturing method thereof. A fiber and a fiber article according to the present disclosure may have high hydrophobicity, preferably both superhydrophobicity and elasticity. Further, as the fiber and fiber article have excellent mechanical stability and chemical durability, the fiber and fiber article may stably exhibit the aforementioned high hydrophobicity and elasticity even under the harsh conditions.

4 Claims, 17 Drawing Sheets

(51) Int. Cl.
C08K 3/36 (2006.01)
C08K 5/02 (2006.01)
D01D 5/00 (2006.01)
D01D 5/38 (2006.01)
B82Y 30/00 (2011.01)
B82Y 40/00 (2011.01)
D06M 101/18 (2006.01)

(52) U.S. Cl.
CPC .............. *D01D 5/0038* (2013.01); *D01D 5/38* (2013.01); *B82Y 30/00* (2013.01); *B82Y 40/00* (2013.01); *D06M 2101/18* (2013.01); *D06M 2200/12* (2013.01)

(56) References Cited

FOREIGN PATENT DOCUMENTS

| | | |
|---|---|---|
| JP | 04779497 B2 | 9/2011 |
| KR | 10-2012-0068659 A | 6/2012 |

OTHER PUBLICATIONS

Roach et al., "Progress in superhydrophobic surface development", Soft Matter, 2008, 4, 224-240.
Celia et al., "Recent advances in designing superhydrophobic surfaces", Journal of Colloid and Interface Science 402(2013) 1-18.
Latthe, et al., "Recent progress in preparation of superhydrophobic surfaces: A review", Journal of Surface Engineered Materials and Advanced Technology, 2012, 2, 76-94.
Ryu, et al., "Nearly Perfect Durable Superhydrophobic Surfaces Fabricated by a Simple One-Step Plasma Treatment" Scientific Repo Rts, 7: 1981, DOI:10.1038/s41598-017-02108-1.
Lim, et al., "Superhydrophobic Films of Electrospun Fibers with Multiple-Scale Surface Morphology", Langmuir, vol. 23, No. 15, 2007.
Cho et al., "A Rubberlike Stretchable Fibrous Membrane with Anti-Wettability and Gas Breathability", Wiley-VCH, Adv. Funct. Mater. 2013.
Lee, et al., "Stretchable Superhydrophobicity from Monolithic, Three-Dimensional Hierarchical Wrinkles", ACS Publications (2016).
Ju et al., "A Highly Stretchable and Robust Non-fluorinated Superhydrophobic Surface", Journal of Materials Chemistry 2017.
Mates et al., "Extremely stretchable and conductive water-repellent coatings for low-cost ultra-flexible electronics", Nature Communications | 6:8874 | DOI: 10.1038/ncomms9874 | www.nature.com/naturecommunications.
Su et al., "A Highly Stretchable and Conductive Superhydrophobic Coating for Flexible Electronics", ACS Publications, ACS Appl. Mater. Interfaces, Just Accepted Manuscript • DOI: 10.1021/acsami. 8b01382 • Publication Date (Web): Mar. 6, 2018.
Hu et al., "Highly Stretchable Superhydrophobic Composite Coating Based on Self-Adaptiv Deformation of Hierarchical Structures", Advanced Science News, Wiley-VCH, 2017.
Rather et al., "Stretchable and Durable Superhydrophobicity That Acts both in Air and Under Oil", A. M. Rather and U. Manna, J. Mater. Chem. A, 2017, DOI: 10.1039/C7TA04073C.
Wang et al., "Fabrication of Two- and Three-Dimensional Silica Nanocolloidal Particle Arrays", J. Phys. Chem. B 2003, 107, 3400-3404.

* cited by examiner

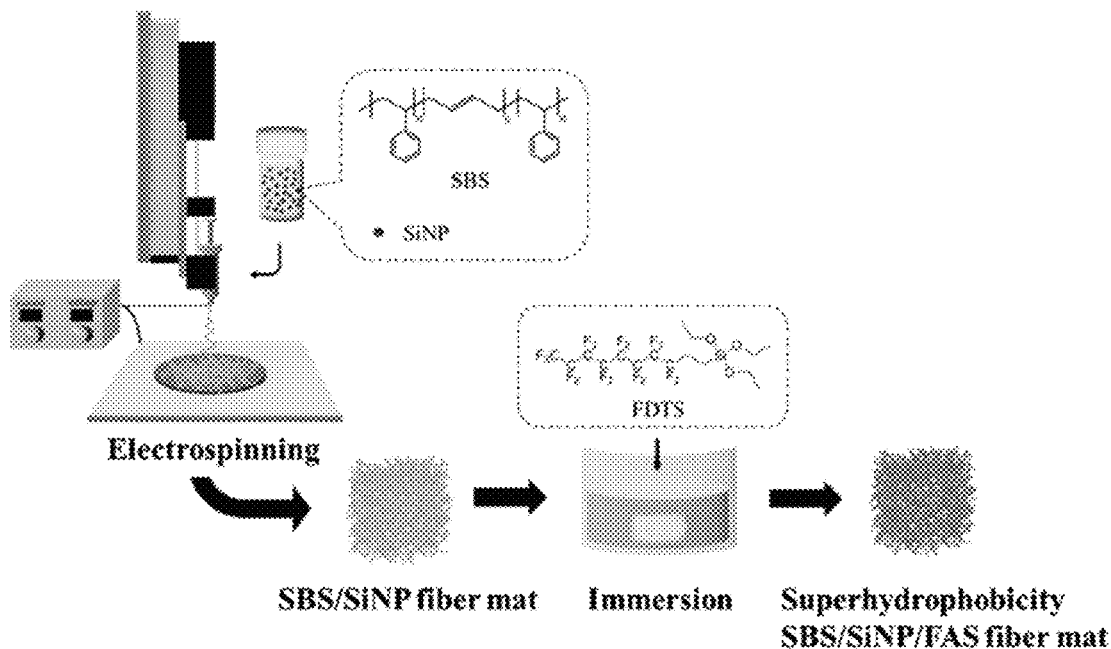
FIG. 1: mimetic diagram illustrating manufacturing method according to embodiment of present disclosure
*Abbreviations: SBS – poly(styrene-butadiene-styrene), SiNP – silica nanoparticles, FDTS – 1H,1H,2H,2H-perfluorodecyltriethoxysilane, FAS – fluoroalkylsilanization
[FIG. 2A]
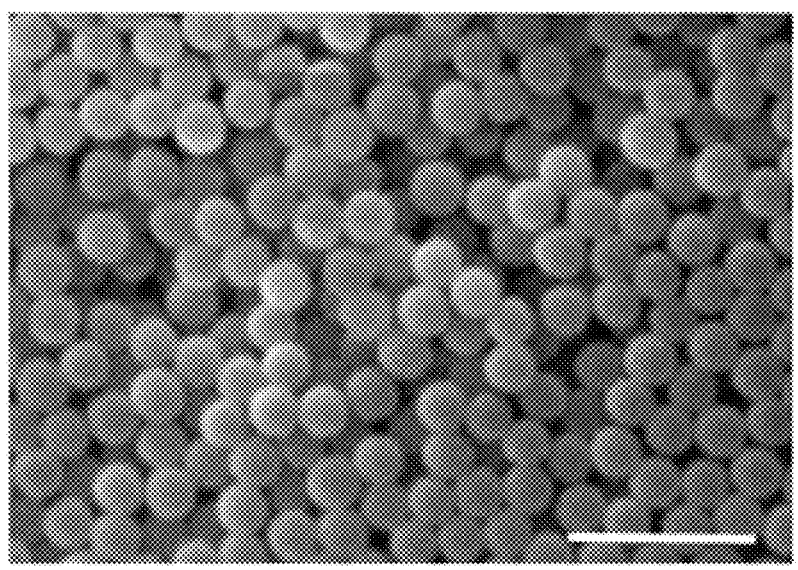

[FIG. 2B]
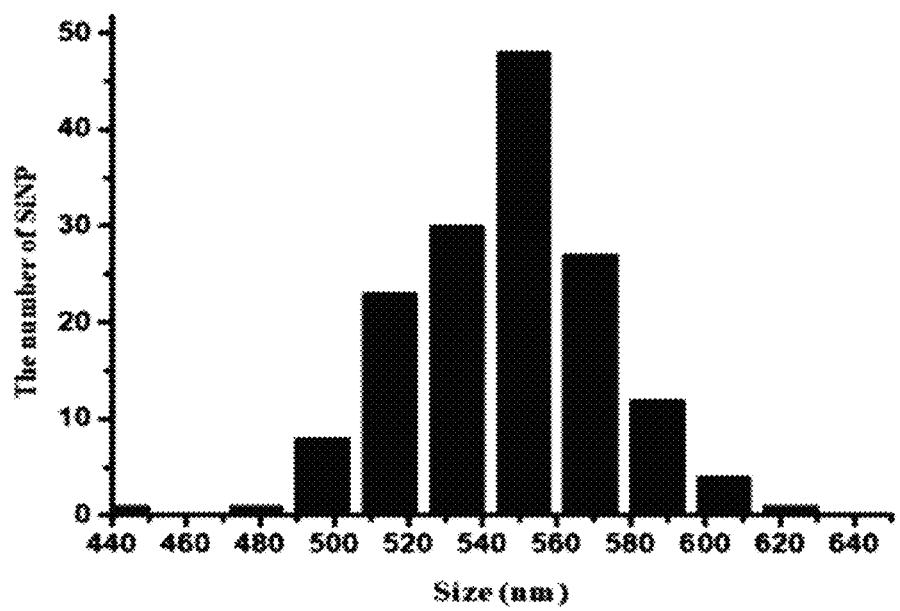
[FIG. 2C]
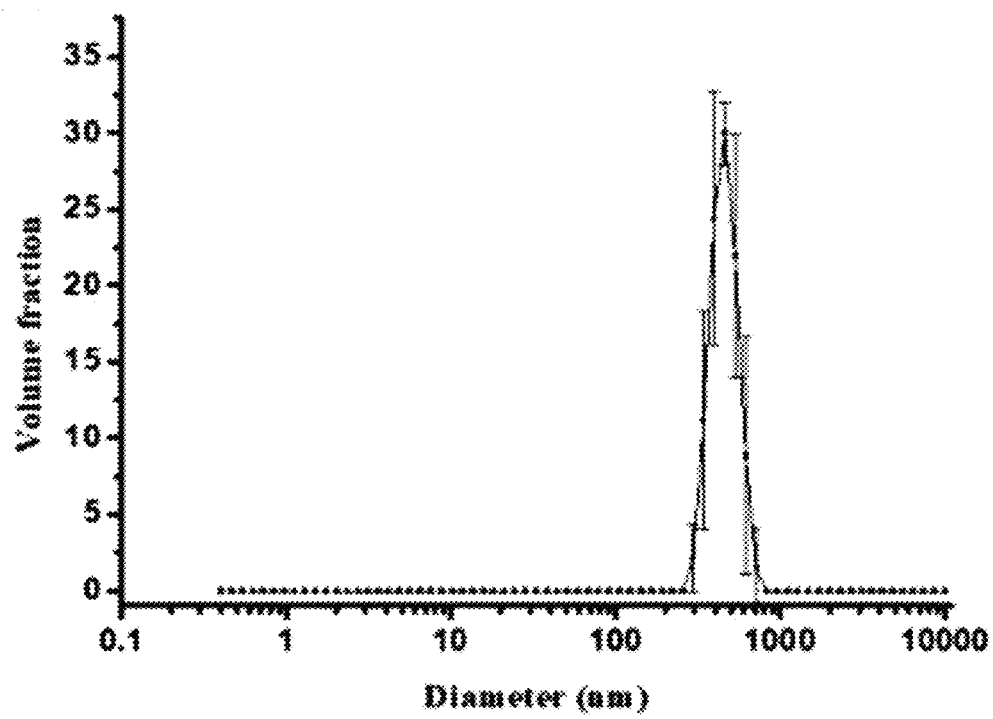

[FIG. 3A]
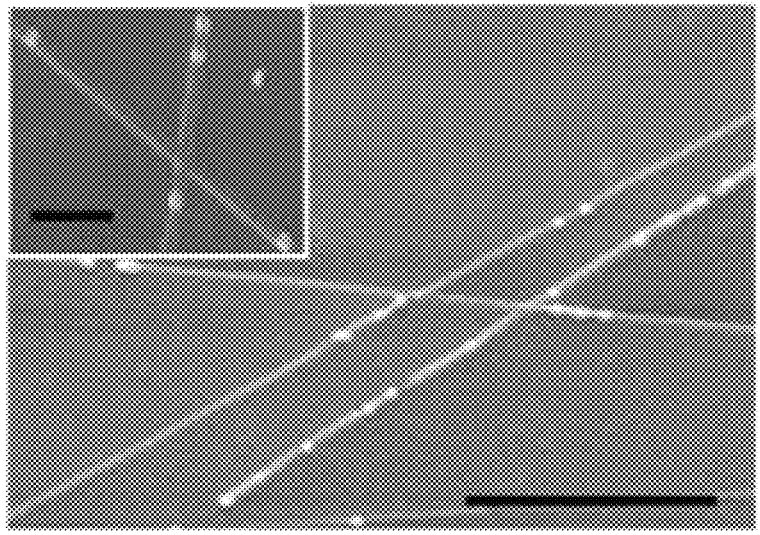
[FIG. 3B]
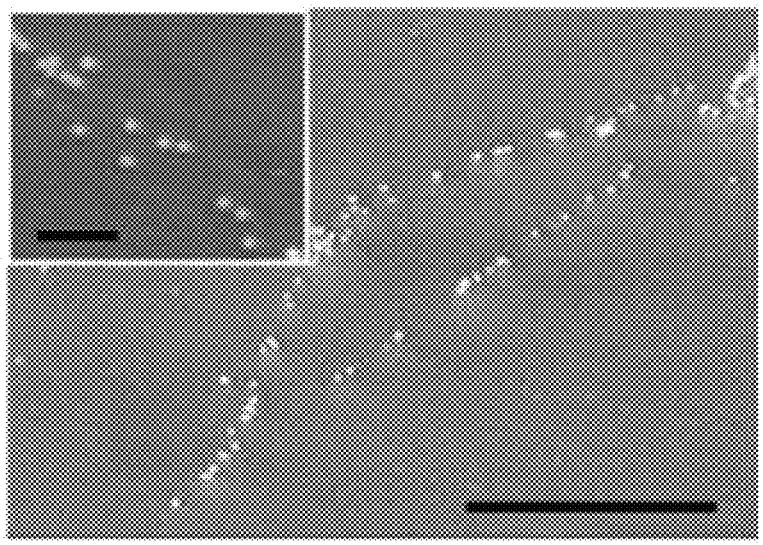

[FIG. 4A]
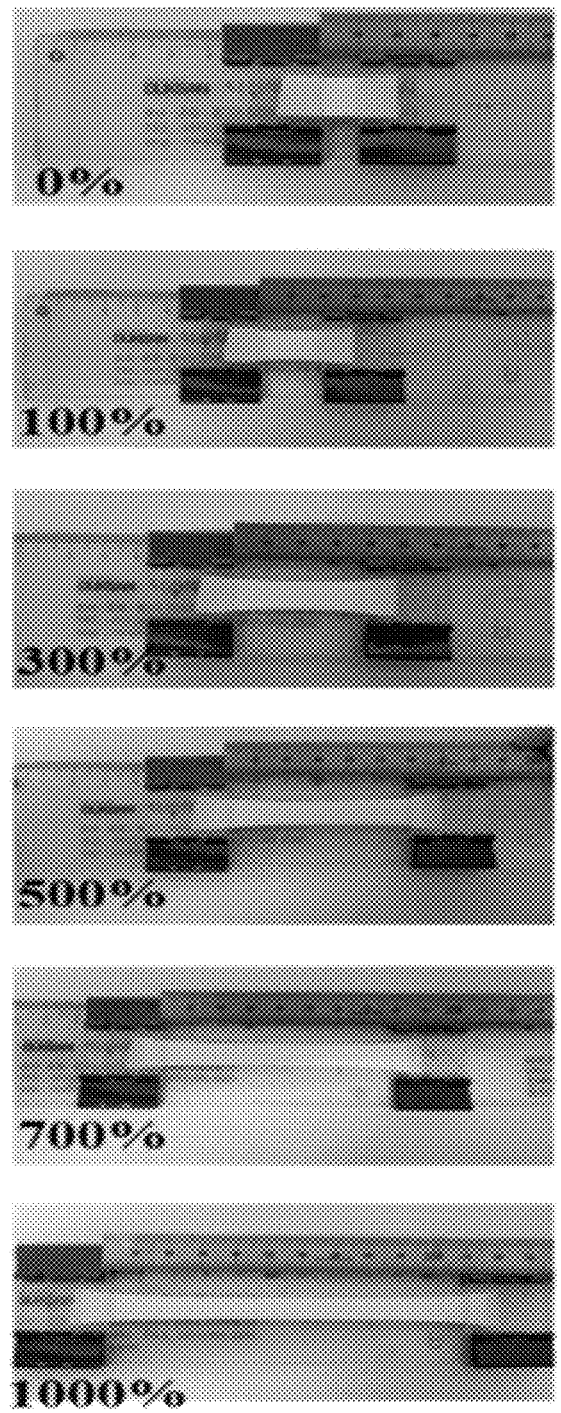

[FIG. 4B]
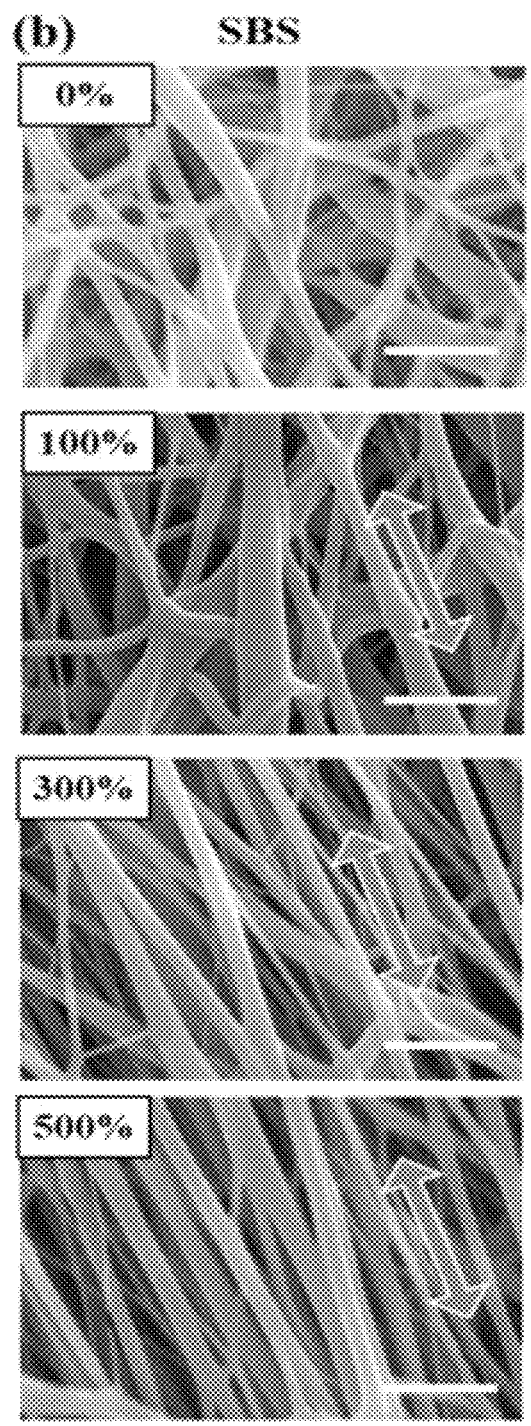

[FIG. 4C]
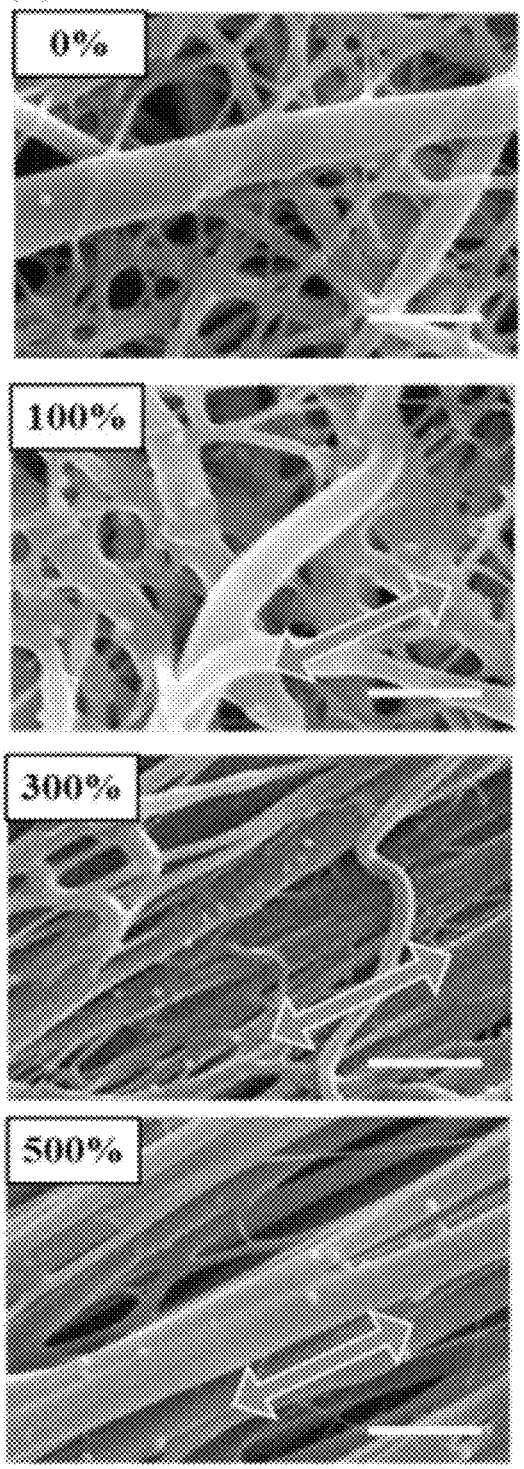

[FIG. 5A]
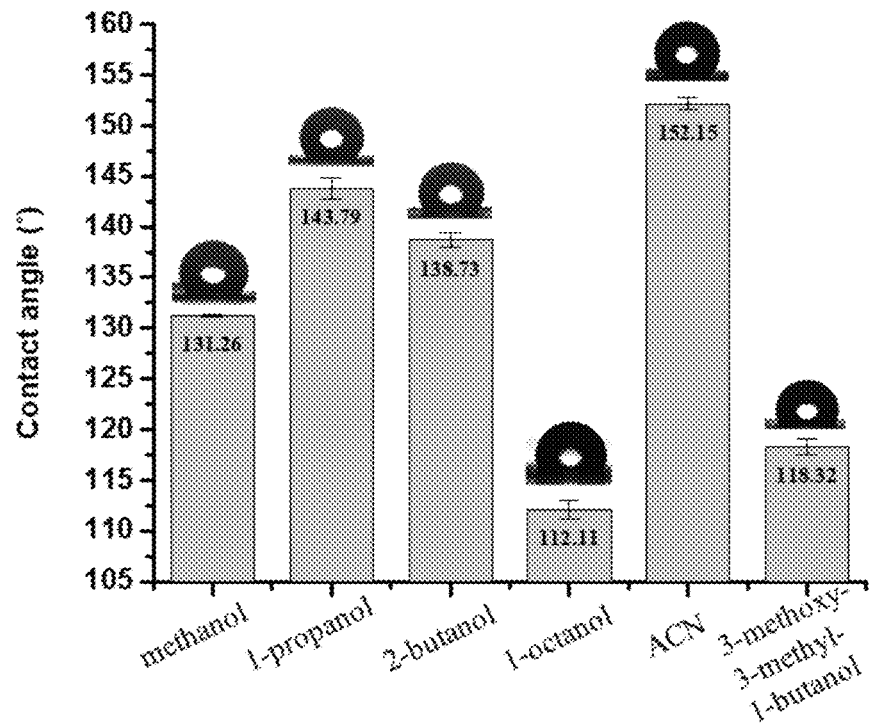
[FIG. 5B]
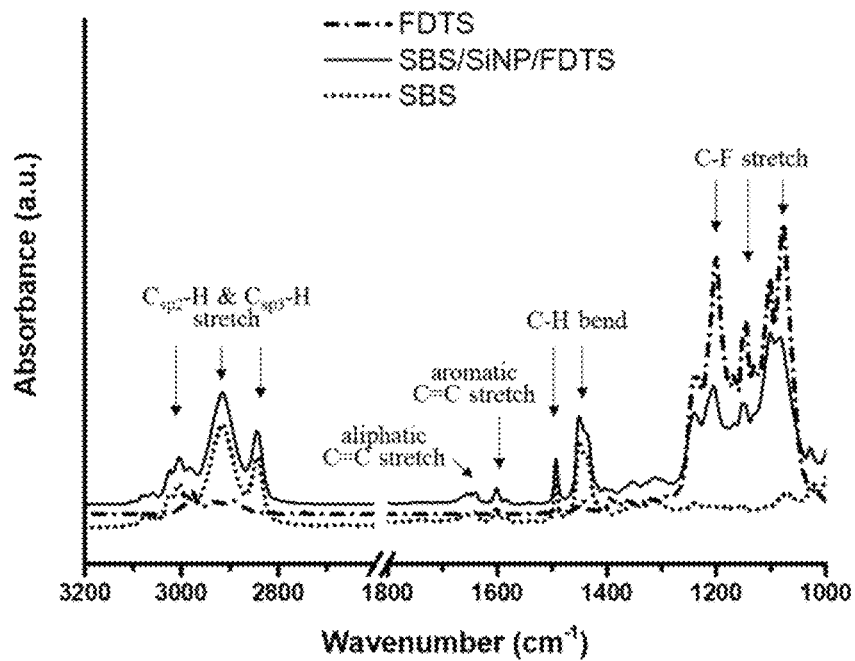

[FIG. 6A]
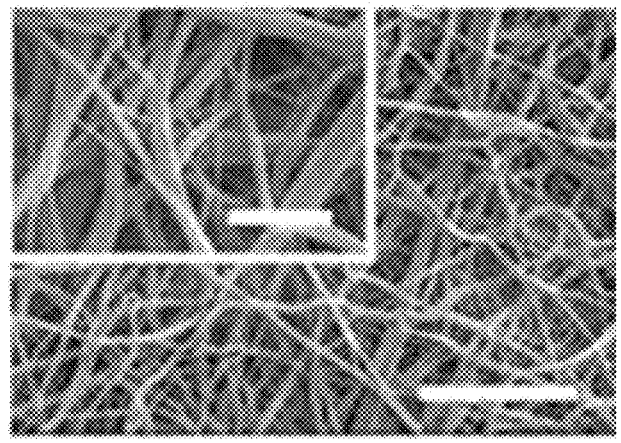
Methanol
[FIG. 6B]
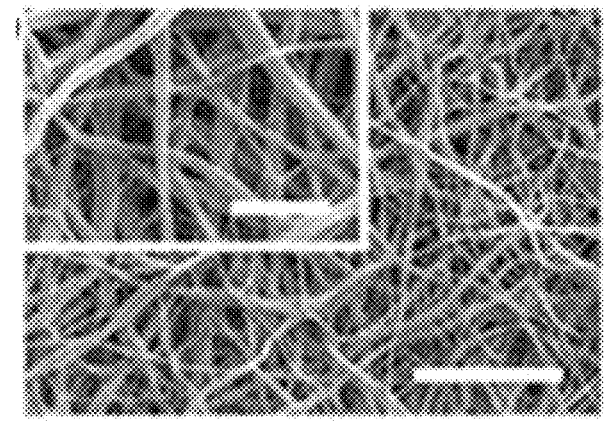
1-propanol

[FIG. 6C]
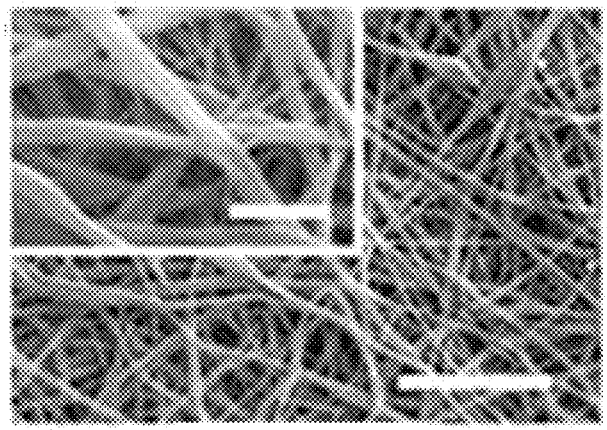
2-butanol
[FIG. 6D]
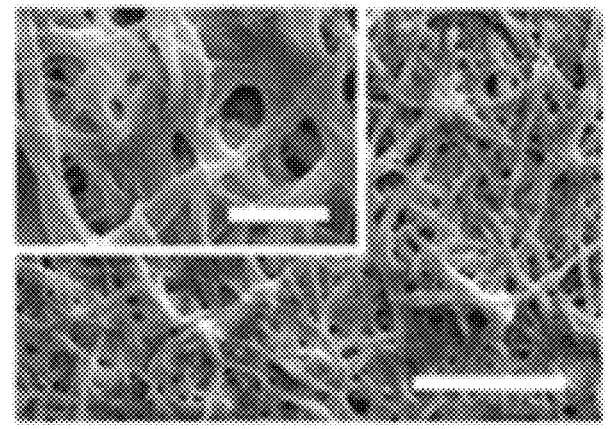
1-octanol

[FIG. 6E]
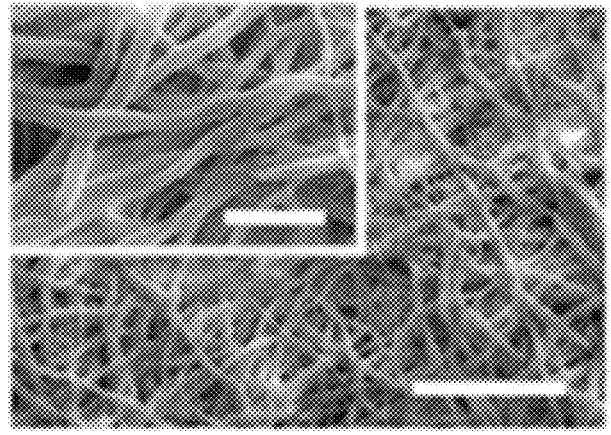
ACN
[FIG. 6F]
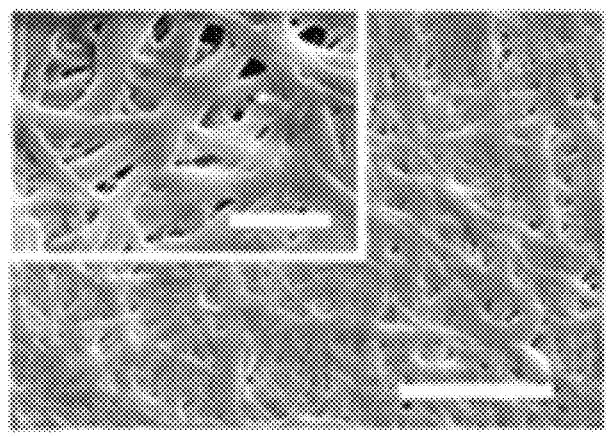
3-methoxy-3-methyl-1-butanol

[FIG. 7A]
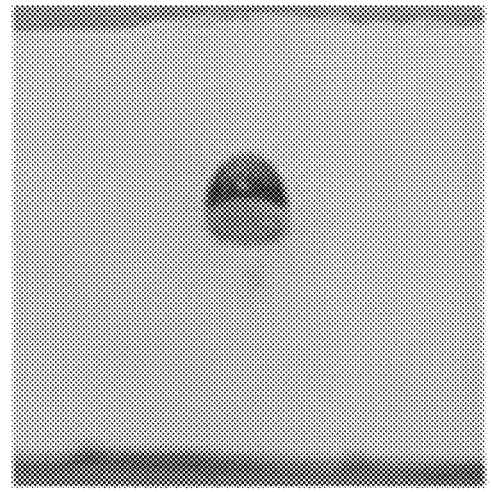
SBS
[FIG. 7B]
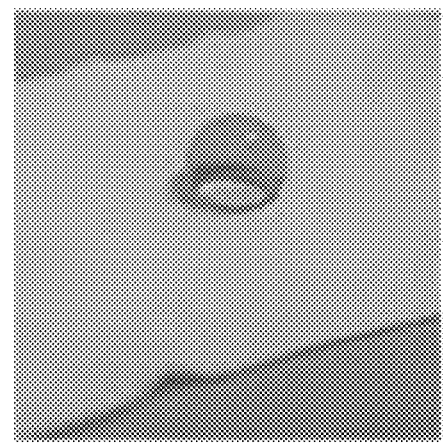
SBS/SiNP/FDTS
(No strain)

[FIG. 7C]
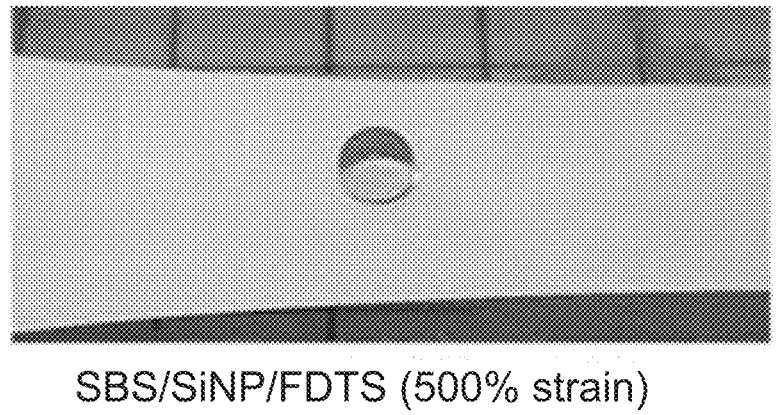
SBS/SiNP/FDTS (500% strain)
[FIG. 7D]
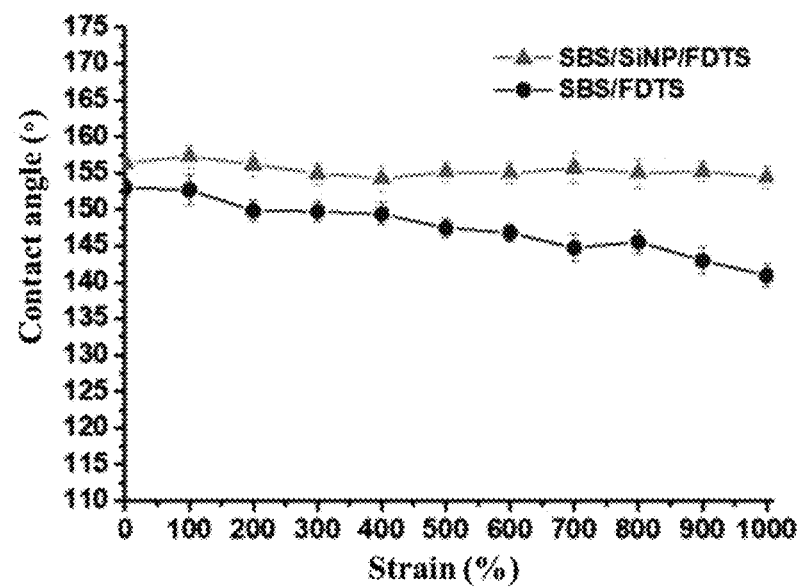

[FIG. 8A]
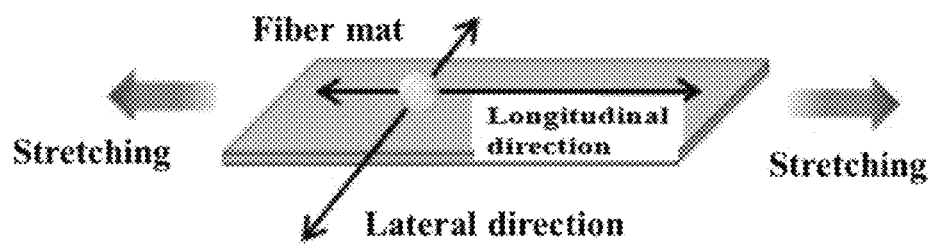
[FIG. 8B]
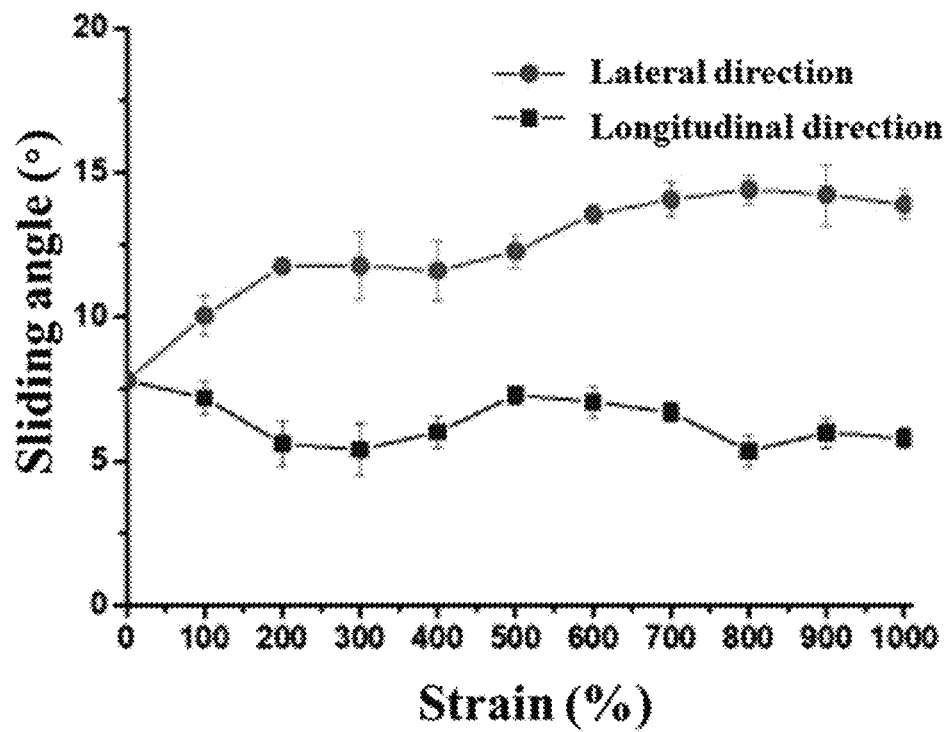

[FIG. 9A]
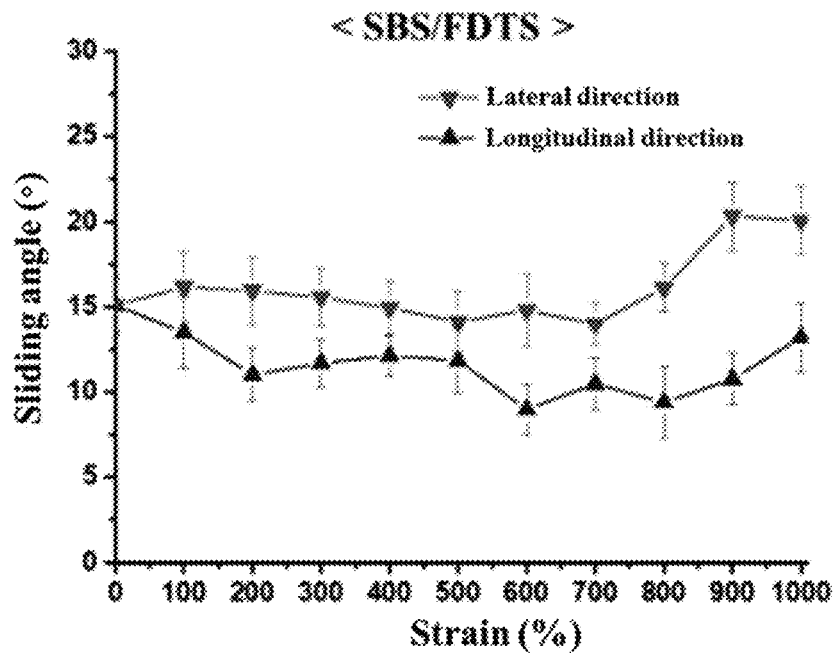
[FIG. 9B]
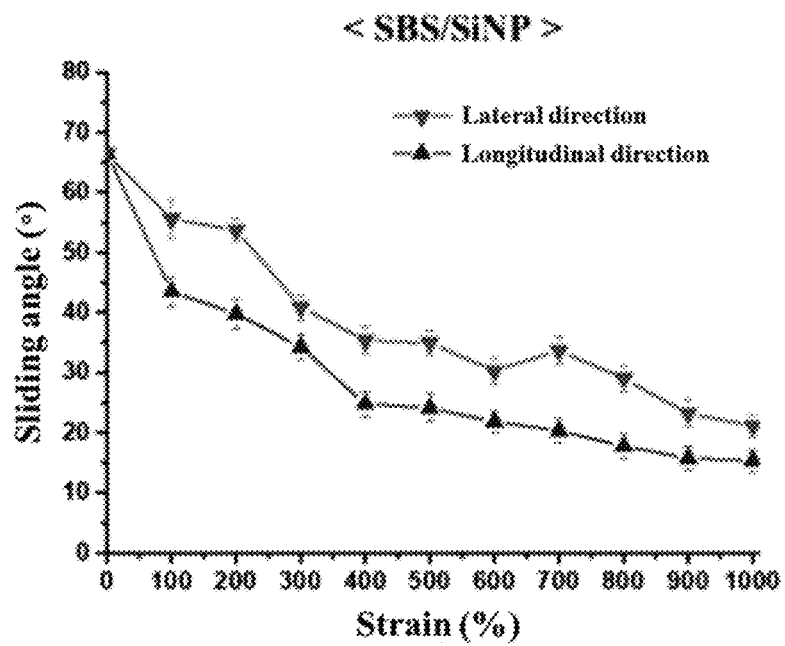

[FIG. 10A]
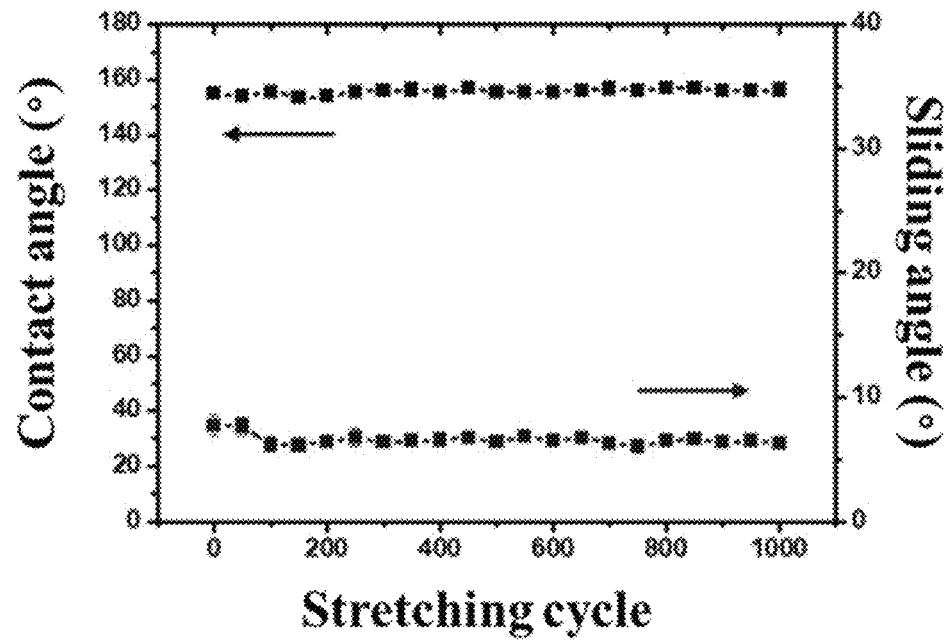
[FIG. 10B]
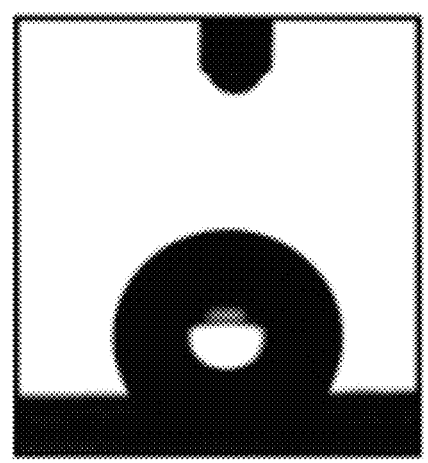
0 cycle

[FIG. 10C]
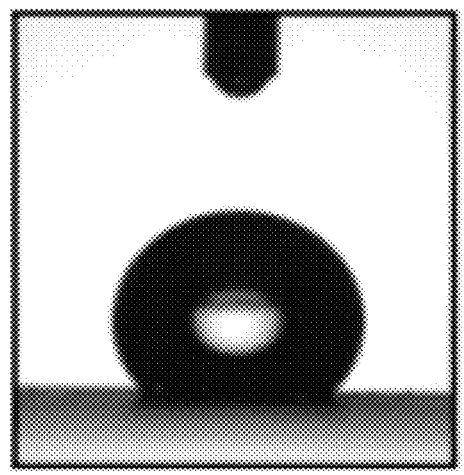
1,000 cycles
[FIG. 11A]
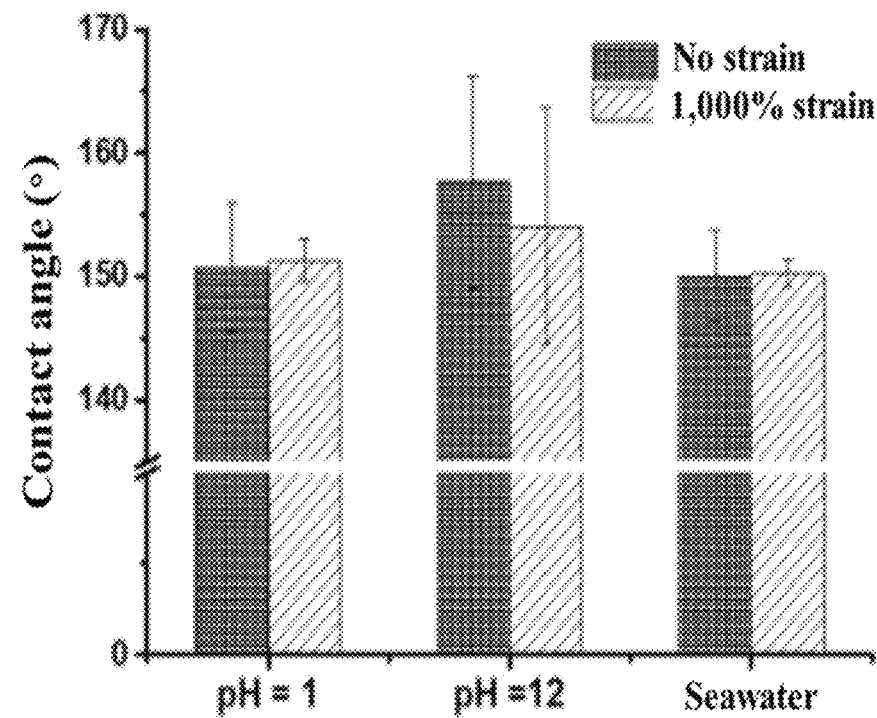

[FIG. 11B]
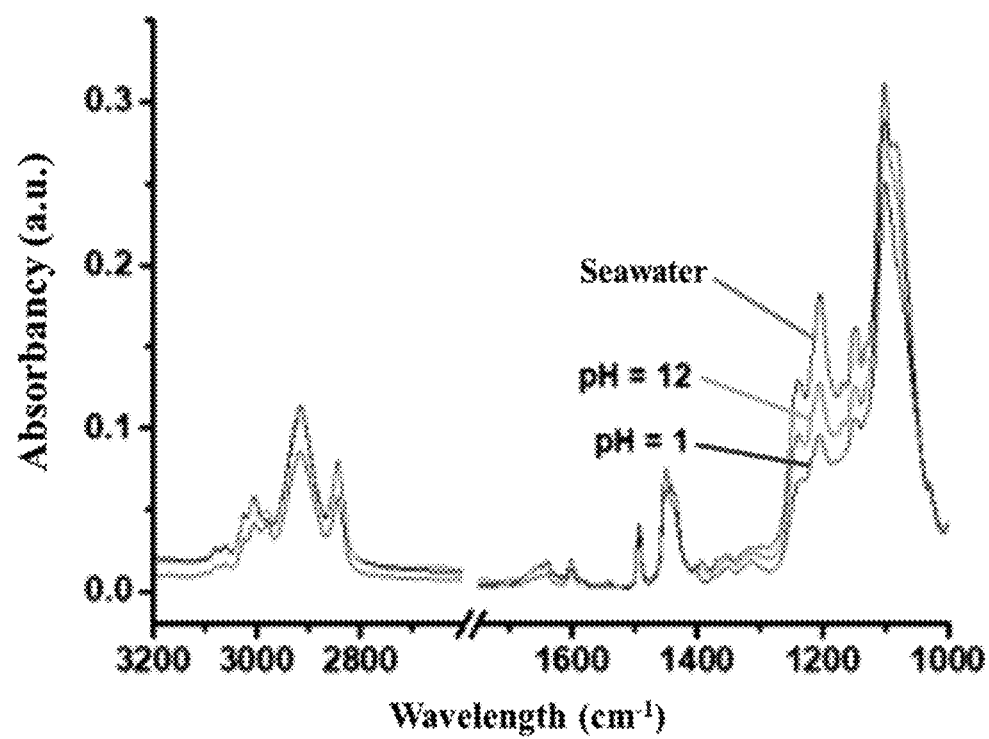

FIBER COMPRISING THERMOPLASTIC ELASTOMER AND SILICA NANOPARTICLE, STRETCHABLE HYDROPHOBIC FIBER ARTICLE PREPARED THEREWITH, AND METHOD FOR PREPARING THE SAME

CROSS-REFERENCE TO RELATED APPLICATIONS

This application is based on and claims priority from Korean Patent Application No. 10-2019-0107036, filed on Aug. 30, 2019, with the Korean Intellectual Property Office, the disclosure of which is incorporated herein in its entirety by reference.

TECHNICAL FIELD

The present disclosure relates to a fiber including a thermoplastic elastomer and silica nanoparticles, a stretchable hydrophobic fiber article manufactured therefrom, and a manufacturing method thereof.

BACKGROUND

A surface having superhydrophobicity has received widespread attention from academia and industry due to its advantages and applicability. Superhydrophobicity is defined as hydrophobic properties of any material when any material has a contact angle of more than 150 degrees and a sliding angle of less than 10 degrees with respect to a hydrophilic flat surface. The superhydrophobic surface exhibits water repellency since the superhydrophobic surface has a very low affinity with water accordingly. The superhydrophobic surface has special properties such as antifogging, moisture-proofing, antifouling, anti-freezing, corrosion proofing properties, and therefore may exhibit chemical stability for a long time even under the harsh conditions. Due to its versatility, the superhydrophobic surface may be importantly used in a variety of applications. Use examples of the superhydrophobic surface may include uses in a medical appliance, an oil-water separator, a battery, a sensor, tissue engineering, a moisture-proofing electronic material, a self-cleaning base material, drag reduction uses in ocean industry, and product lifetime-extending uses. There have been various attempts to increase surface roughness and/or reduce surface energy by imitating lotus leaf structure in relation to the implementation of the superhydrophobic surface (refer to non-patent documents 1 and 2). Further, there have also been attempts to acquire superhydrophobicity through electrochemical deposition, electrospinning, wet chemical reaction, hydrothermal synthesis, multilayer coating method, sol-gel method, plasma treatment, and others (refer to non-patent documents 3 to 6).

On the other hand, a demand for flexible materials having water repellency and elasticity is particularly high in the development process of modern technology of the materials including a flexible electronic material, an electronic skin, a smart fabric, and a wearable device. However, high elasticity and superhydrophobicity are heterogeneous parameters in which it is not only difficult to achieve the high elasticity and superhydrophobicity at the same time, but also is difficult to maintain the high elasticity and superhydrophobicity at an equal level. One of the reasons is that a material of imparting superhydrophobicity has a micro-nano sized structure which can hardly be kept stably generally under high strain, in which surface roughness disappears when such a micro-nano sized structure is damaged. Further, chemical components contributing to low surface energy may be cracked or may easily fall off the surface during deformation. Therefore, maintaining excellent mechanical stability is also a core element which should be considered during manufacturing.

Many methods for achieving a stretchable superhydrophobic surface have been developed over the years. In one research, superhydrophobicity has been manifested by coating an elastic polyurethane fiber matrix with polyaniline and polytetrafluoroethylene (non-patent document 7). Further, stretchable superhydrophobicity has also been manifested by manufacturing a monolithic poly(dimethylsiloxane) substrate with three-dimensional hierarchical wrinkles (non-patent document 8). A strategy of spraying or coating a chemical solution on a natural rubber strip such as polyurethane has been usually used. Materials which have been reported to be used for coating include a polybutadiene elastomer-based complex and carbon black, a bulk carbon nanofiber and a wax-polyolefin thermoplastic blend, a thermoplastic elastomer and alkane thiol-modified silver nanoparticles, a silicone elastomer oligomer and silica nanoparticles, and a hydrophobic small molecule on a modified polyurethane fiber substrate (refer to non-patent documents 9 to 13). However, most of such materials have been operated under a limited strain (100 to 500%), and only some of the articles could have maintained a high strain of more than 800% (refer to non-patent documents 11 and 12). In general, the higher elasticity a matrix has, the lower an elastic modulus is, and this means a solid material can undergo greater deformation with smaller forces. Since an effective modulus of human skin has been known to be not more than 100 kPa, it may be effective for a base material used in the human skin to have a modulus value or elasticity similar to that described above in order to utilize a wearable device. Therefore, a very high stretchable base material (~1,000%) having a low elasticity modulus not only may be used well in a wearable device and a functional fabric, but also may fit well to soft tissues including human skin and organs.

PRIOR ART DOCUMENTS

Non-Patent Documents

[Non-patent document 1] L. Xue-Mei, D. Reinhoudt, M. Crego-Calama, What do we need for a superhydrophobic surface? A review on the recent progress in the preparation of superhydrophobic surfaces, Chem. Soc. Rev. 36 (2007) 1350-1368

[Non-patent document 2] P. Roach, N. J. Shirtcliffe, M. I. Newton, Progress in superhydrophobic surface development, Soft Matter 4 (2008) 224-240

[Non-patent document 3] E. Celia, T. Darmanin, E. Taffin de Givenchy, S. Amigoni, F. Guittard, Recent advances in designing superhydrophobic surfaces, J. Colloid Interface Sci. 402 (2013) 1-18

[Non-patent document 4] S. S. Latthe, A. B. Gurav, C. S. Maruti, R. S. Vhatkar, Recent Progress in Preparation of Superhydrophobic Surfaces: A Review, J. Surf. Eng. Mater. Adv. Technol. 2 (2012)76-94

[Non-patent document 5] J. Ryu, K. Kim, J. Y. Park, B. G. Hwang, Y. C. Ko, H. J. Kim, J. S. Han, E. R. Seo, Y. J. Park, S. J. Lee, Nearly Perfect Durable Superhydrophobic Surfaces Fabricated by a Simple One-Step Plasma Treatment, Sci. Rep. 7 (2017) 1-8

[Non-patent document 6] L. Jong-Min, Y. Gi-Ra, J. H. Moon, H. Chul-Joon, Y. Seung-Man, Superhydrophobic Films of Electrospun Fibers with Multiple-Scale Surface Morphology, Langmuir 23 (2007) 7981-7989

[Non-patent document 7] S. J. Cho, H. Nam, H. Ryu, G. Lim, A Rubberlike Stretchable Fibrous Membrane with Anti-Wettability and Gas Breathability, Adv. Funct. Mater. 23 (2013) 5577-5584

[Non-patent document 8] L. Won-Kyu, J. Woo-Bin, S. R. Nagel, T. W. Odom, Stretchable Superhydrophobicity from Monolithic, Three-Dimensional Hierarchical Wrinkles, Nano Lett. 16 (2016) 3774-3779

[Non-patent document 9] J. Ju, X. Yao, X. Hou, Q. Liu, Y. S. Zhang, A. Khademhosseini, A highly stretchable and robust non-fluorinated superhydrophobic surface, J. Mater. Chem. A. 5 (2017) 16273-16280

[Non-patent document 10] J. E. Mates, I. S. Bayer, J. M. Palumbo, P. J. Carroll, C. M. Megaridis, Extremely stretchable and conductive water-repellent coatings for low-cost ultra-flexible electronics, Nat. Commun. 6 (2015) 1-8

[Non-patent document 11] X. Su, H. Li, X. Lai, Z. Chen, X. Zeng, Highly Stretchable and Conductive Superhydrophobic Coating for Flexible Electronics, ACS Appl. Mater. Interf. 10 (2018) 10587-10597

[Non-patent document 12] X. Hu, C. Tang, Z. He, H. Shao, K. Xu, J. Mei, L. Woon-Ming, Highly Stretchable Superhydrophobic Composite Coating Based on Self-Adaptive Deformation of Hierarchical Structures, Small 13 (2017) 1-10

[Non-patent document 13] A. M. Rather, U. Manna, Stretchable and durable superhydrophobicity that acts both in air and under oil, J. Mater. Chem. A. 5 (2017) 15208-15216

[Non-patent document 14] W. Wang, B. Gu, L. Liang, W. Hamilton, Fabrication of Two- and Three-Dimensional Silica Nanocolloidal Particle Arrays, J. Phys. Chem. B. 107 (2003) 3400-3404

SUMMARY

An objective of the present disclosure is to provide a fiber which may be used in manufacturing of a fiber article having excellent elasticity and hydrophobicity and a stretchable hydrophobic fiber article manufactured therefrom.

The other objective of the present disclosure is to provide a method of manufacturing the fiber or article.

According to an embodiment of the present disclosure, a fiber for manufacturing a stretchable hydrophobic fiber article is provided, the fiber including silica nanoparticles which are surface-modified such that the silica nanoparticles include a hydrocarbon chain, and a styrene-based thermoplastic elastomer.

According to an additional embodiment of the present disclosure, a fiber for manufacturing a stretchable hydrophobic fiber article in which at least some of the silica nanoparticles are included in the fiber is provided.

According to another additional embodiment of the present disclosure, the styrene-based thermoplastic elastomer may be a linear polystyrene-based block copolymer.

According to another additional embodiment of the present disclosure, the fiber may be additionally surface-treated such that the fiber includes a fluoroalkyl group.

According to another additional embodiment of the present disclosure, the hydrocarbon chain may be a linear or branched aliphatic hydrocarbon chain having 1 to 30 carbon atoms.

According to another additional embodiment of the present disclosure, a stretchable hydrophobic fiber article including at least two of the fiber is provided.

According to another additional embodiment of the present disclosure, the article has a contact angle of more than 150 degrees and a longitudinal sliding angle of less than 10 degrees with respect to any hydrophilic flat surface, and the contact angle and sliding angle may be within the aforementioned numerical value ranges even under 500% strain or more.

According to another additional embodiment of the present disclosure, a method of manufacturing the fiber is provided, the method including the steps of: preparing silica nanoparticles; manufacturing surface-modified silica nanoparticles by surface-modifying the silica nanoparticles such that the silica nanoparticles include the hydrocarbon chain using a silane coupling agent including a hydrocarbon chain; preparing a styrene-based thermoplastic elastomer; adding the surface-modified silica nanoparticles to the styrene-based thermoplastic elastomer; and obtaining a fiber for manufacturing a stretchable hydrophobic fiber article from a composition of the styrene-based thermoplastic elastomer and the surface-modified silica nanoparticles.

According to another additional embodiment of the present disclosure, a method of manufacturing the fiber, the method further including the step of surface-treating the manufactured fiber such that the manufactured fiber includes a fluoroalkyl group, is provided.

According to another additional embodiment of the present disclosure, the additional surface-treatment process may be performed by immersing the manufactured fiber in a fluoroalkyl silane coupling agent-containing solution.

According to another additional embodiment of the present disclosure, the fluoroalkyl silane coupling agent-containing solution may contain acetonitrile as a solvent.

According to another additional embodiment of the present disclosure, the step of obtaining the fiber may be performed by electrospinning.

A fiber according to the present disclosure and an article obtained therefrom may have high hydrophobicity, preferably both superhydrophobicity and elasticity. Further, as the fiber and article have excellent mechanical stability and chemical durability, the fiber and article may stably exhibit the aforementioned high hydrophobicity and elasticity even under the harsh conditions.

As the fiber and article according to the present disclosure have high degrees of elasticity and hydrophobicity, the fiber and article according to the present disclosure may be used in various fields including a functional fabric, a wearable device, a flexible electronic material, and a transplantable biosensor.

BRIEF DESCRIPTION OF THE DRAWINGS

FIG. 1 is a mimetic diagram schematically illustrating a method of manufacturing a fiber and a fiber article according to an embodiment of the present disclosure;

FIG. 2A illustrates an SEM image (scale bar: 2 μm) of silica nanoparticles manufactured according to Examples;

FIG. 2B shows a size distribution chart of the silica nanoparticles measured by the SEM image;

FIG. 2C shows a dynamic light scattering (DLS) diameter distribution chart of the silica nanoparticles;

FIG. 3A is an SEM image (scale bar: 20 μm) illustrating an electrospun fiber which has been intactly electrospun;

FIG. 3B shows an SEM image (scale bar: 20 μm) illustrating silica nanoparticles which have been remained after firing the fiber, and small images within the SEM images are high-magnification SEM images (scale bar: 5 μm);

FIGS. 4A-4C illustrate photographs and SEM images obtained when stretching an electrospun fiber mat of SBS and an electrospun fiber mat of SBS/SiNP under a strain;

FIG. 4A depicts photographs obtained when stretching an SBS/SiNP mat to 1,000%;

FIG. 4B is an SEM image (scale bar: 30 μm) obtained when stretching an SBS mat under strains of 0%, 100%, 300%, and 500%;

FIG. 4C is an SEM image (scale bar: 30 μm) obtained when stretching the SBS/SiNP mat under strains of 0%, 100%, 300%, and 500%;

FIG. 5A shows contact angles of SBS/FDTS obtained from different types of solvents used when performing a surface treatment process by fluoroalkylsilanization;

FIG. 5B shows FT-IR spectrums of SBS, an SBS/SiNP/FDTS mat, and FDTS;

FIG. 6A-6F show SEM images of SBS/SiNP/FDTS obtained from different types of solvents used when performing a surface treatment process by fluoroalkylsilanization, and small images within the respective images are high-resolution images (scale bar: 5 μm), wherein the solvents are as follows:

FIG. 6A: methanol;
FIG. 6B: 1-propanol;
FIG. 6C: 2-butanol;
FIG. 6D: 1-octanol;
FIG. 6E: ACN; and
FIG. 6F 3-methoxy-3-methyl-1-butanol;

FIG. 7A to FIG. 7C are respective photographs obtained when putting a water droplet (dyed with green color) on:

FIG. 7A: an SBS mat;
FIG. 7B: an SBS/SiNP/FDTS mat in a strain-free condition;
FIG. 7C: an SBS/SiNP/FDTS mat under 500% strain;

FIG. 7D is a graph showing changes in contact angles obtained when applying different strain levels to an SBS/FDTS mat and an SBS/SiNP/FDTS mat;

FIG. 8A shows longitudinal and lateral water droplet movements obtained when stretching a fiber mat;

FIG. 8B is a graph showing changes in sliding angles obtained when applying different strain levels to SBS/SiNP/FDTS;

FIG. 9A is a graph showing sliding angle change for SBS/FDTS obtained when applying different strain levels;

FIG. 9B is a graph showing a sliding angle change for SBS/SiNP obtained when applying different strain levels;

FIG. 10A shows changes in contact angles and sliding angles for an SBS/SiNP/FDTS mat after repeating a stretching-relaxation cycle, in which both of the two angles were measured in a strain-free condition;

FIG. 10B shows the mat at 0 cycle;
FIG. 10C shows the mat at 1,000 cycles;

FIG. 11A illustrates contact angles of an SBS/SiNP/FDTS mat treated with different aqueous solutions under 0% strain and 1,000% strain; and FIG. 11B illustrates FT-IR spectrums of the treated fiber mat.

DETAILED DESCRIPTION

Hereinafter, embodiments of the present disclosure are described in detail. However, the embodiments of the present disclosure, as embodiments for description, should not be construed as a way of limiting the scope of the present disclosure.

Styrene-Based Thermoplastic Elastomer

The styrene-based thermoplastic elastomer may be a block copolymer, specifically a linear block copolymer. More specifically, the styrene-based thermoplastic elastomer may include a styrene-butadiene-styrene (SBS) block copolymer, a styrene-isoprene-styrene (SIS) block copolymer, a styrene-ethylene-butadiene-styrene (SEBS) block copolymer, a styrene-ethylene-isoprene-styrene (SEIS) block copolymer and others, and mixtures of two or more thereof. SBS may be preferably used since particularly SBS among the above-listed block copolymers is a cost-effective material which may be easily processed into a fiber, and widely used in various products including household articles, toys, tires, footwear, sporting goods, asphalt, etc. The aforementioned SBS was also approved by the FDA to allow SBS to contact food.

Silica Nanoparticles

Nanoparticles in the present disclosure are referred to as particles with nanoscale particle sizes.

Silica ($SiO_2$) nanoparticles in the present disclosure may be manufactured by producing a precursor by a seeded-growth method or a Stober-Fink-Bohn method. Specifically, the silica nanoparticles may be obtained by adding a silane inorganic material to a basic solution, and hydrolyzing and condensing the silane inorganic material added to the basic solution.

Here, "the basic solution" is referred to as a solution containing a basic material, the basic solution may include ammonia water, potassium hydroxide, sodium hydroxide or the like as the basic material, and the basic solution preferably includes ammonia water as the basic material by considering removal easiness after performing a reaction process. The basic solution may further include water or alcohol.

The silane inorganic material may be an orthosilicic acid organic compound. Here, the orthosilicic acid organic compound is referred to as a compound with a structure in which an alkyl group is bonded to orthosilicic acid ions ($SiO_4^{4-}$). For example, the orthosilicic acid organic compound may be tetraethyl orthosilicate (TEOS) or tetramethyl orthosilicate (TMOS).

The silica nanoparticles which have been obtained as they are may be hydrophilic as surfaces of the silica nanoparticles have a hydroxyl group. Therefore, the silica nanoparticles according to the present disclosure are surface-modified such that the surfaces of the silica nanoparticles include a hydrocarbon chain. For example, the surface modification process may be performed by using a silane coupling agent in accordance with the procedures stated in the aforementioned non-patent document 14. For example, the surface modification process may be performed by adding the silica nanoparticles to a silane coupling agent-containing solution, stirring the silica nanoparticles added to the silane coupling agent-containing solution for plenty of time, and removing a solvent from the stirred material.

The silane coupling agent is referred to as a coupling agent including silane as a central core. In the present disclosure, the silane coupling agent is a silane coupling agent including a hydrocarbon chain. The hydrocarbon chain may be a linear or branched aliphatic hydrocarbon having 1 to 30 carbon atoms, specifically a linear or branched alkyl group having 1 to 30 carbon atoms. From a practical point of view, the hydrocarbon chain may have 2 to 20 carbon atoms. Examples of the silane coupling agent may include trimethoxy(propyl)silane, trimethoxy(hexyl)silane, trimethoxy(n-octyl)silane, trimethoxy(dodecyl)silane, trimethoxy(octadecyl)silane, and others.

The silica nanoparticles may have hydrophobic surfaces by surface-modifying the silica nanoparticles such that the silica nanoparticles include a hydrocarbon chain in accordance with the present disclosure. Further, as the silica nanoparticles obtain superior affinity with the aforementioned thermoplastic elastomer by having hydrophobic surfaces as described above, the silica nanoparticles may contribute to lowering the surface energy of a product in the future.

As described later, at least some of the silica nanoparticles may be included in the fiber by manufacturing a fiber from the silica nanoparticles.

The surface-modified silica nanoparticles may have a diameter of preferably 1,000 nm or less, specifically 400 to 700 nm, and may have an average diameter of approximately 500 to 600 nm.

Manufacturing a Fiber and a Fiber Article

According to the present disclosure, a method of manufacturing a fiber is provided, the method including the steps of: preparing silica nanoparticles; manufacturing surface-modified silica nanoparticles by surface-modifying the silica nanoparticles such that the silica nanoparticles include the hydrocarbon chain using a silane coupling agent including a hydrocarbon chain; preparing a styrene-based thermoplastic elastomer; adding the surface-modified silica nanoparticles to the styrene-based thermoplastic elastomer; and obtaining a fiber for manufacturing a stretchable hydrophobic fiber article from a composition of the styrene-based thermoplastic elastomer and the surface-modified silica nanoparticles. Here, a stretchable hydrophobic fiber article including at least two or more of the fibers may be manufactured by using the manufactured fibers.

The step of obtaining the fiber may be performed by electrospinning. At this time, a fiber article according to the present disclosure may be formed as two or more of the fibers are connected to each other or/and stacked while the fiber is being obtained by electrospinning. The electrospinning is a method which may be desirably used in obtaining surface hydrophobicity. Hereinafter, a method for obtaining a fiber and a fiber article according to the present disclosure by electrospinning will be described more specifically.

The styrene-based thermoplastic elastomer may be prepared in the form of a solution so as to perform the electrospinning process. A composition is prepared by adding the surface-modified silica nanoparticles to the thermoplastic elastomer solution prepared as described above, and a fiber and a fiber article according to the present disclosure may be obtained by electrospinning the composition.

The thermoplastic elastomer solution is obtained by dissolving a thermoplastic elastomer in a solvent. If the thermoplastic elastomer may be dissolved by the solvent, the solvent is not particularly limited. For example, the solvent may include dimethylformamide (DMF), dimethylacetamide (DMAc), dimethyl sulfoxide (DMSO), or the like. However, although the solvent may dissolve the thermoplastic elastomer, the solvent may not be suitable for electrospinning as the solvent has low volatility. In this case, rapid evaporation of the solvent may be induced during electrospinning by adding a large amount of a solvent with high volatility to the solvent, thereby preparing a solvent mixture. Accordingly, a solution is prepared by using a solvent mixture in which DMF is mixed with tetrahydrofuran (THF) and adding the thermoplastic elastomer to the solvent mixture in Examples according to the present disclosure described later.

When a thermoplastic elastomer solution having silica nanoparticles added thereto is prepared, an electrospun fiber may be manufactured by electrospinning the thermoplastic elastomer solution having the silica nanoparticles added thereto. At this time, in order to manufacture uniform electrospun fibers on surfaces of which beads are not formed, electrospinning conditions including a spinning rate of the solution, a voltage applied to an electrospinning apparatus, a diameter of spinning needles, a distance between the needles and a fiber dust collector, and others are important. Such electrospinning conditions may be varied according to components of the solution such as a thermoplastic elastomer, and a solvent, and may be properly selected by a person of ordinary skill in the art.

Subsequent Surface Treatment of a Fiber or a Fiber Article

Subsequently, a fiber or a fiber article according to the present disclosure including a thermoplastic elastomer and surface-modified silica nanoparticles may be additionally surface-treated.

The subsequent surface treatment process may be fluoroalkylsilanization. The subsequent surface treatment process is performed such that the fiber or article includes a fluoroalkyl group. As the fluoroalkyl group included in the fiber or article through the surface treatment process of the fiber or article as described above may reduce surface energy, the fiber or article may have more improved hydrophobicity, and may preferably achieve superhydrophobicity through the surface treatment process.

The surface treatment process may be performed by using a fluoroalkyl silane coupling agent-containing solution. Here, the fluoroalkyl silane coupling agent, e.g., may be fluoroalkyl silane, specifically 1H, 1H, 2H, 2H-perfluorooctyltriethoxysilane or 1H, 1H, 2H, 2H-perfluorodecyltriethoxysilane.

In the fluoroalkyl silane coupling agent-containing solution, a solvent is not particularly limited if the solvent may be mixed with the coupling agent, and the solvent has enough volatility to dry quickly. However, a solvent which dissolves a thermoplastic elastomer according to the present disclosure may not be used. The solvent may be a polar solvent, e.g., acetonitrile and alcohols, and is most preferably acetonitrile. As can be seen in Examples described later, the fiber and article may have more excellent superhydrophobicity by using acetonitrile as the solvent. As the fluoroalkyl silane coupling agent may form micelle in acetonitrile, and the micelle becomes a layer which is physically adsorbed onto surfaces of the fiber and article, the acetonitrile is thought to increase contact angles of the fiber and article.

A method of performing the surface treatment process is not particularly limited as long as the method doesn't have an effect on characteristics of a fiber and an article according to the present disclosure. A solution immersion method is preferably used in the present disclosure, and the reason is that the solution immersion method is an easy method capable of performing a surface treatment process at a low cost in a short time. The solution immersion method may be performed by immersing the fiber or fiber article in the fluoroalkyl silane coupling agent-containing solution.

Stretchable Hydrophobic Fiber Article

A fiber article including the fiber according to the present disclosure has elasticity and hydrophobicity. The article means an object having a two-dimensional or three-dimensional structure which is formed by connecting and/or stacking at least two of the fibers. The article may be formed in a mat shape in which two or more of the fibers are interwound. Further, the article may be a matrix having a three-dimensional networking structure.

The article according to the present disclosure may have hydrophobicity, preferably superhydrophobicity. Accordingly, the article may have a contact angle of more than 150 degrees and a longitudinal sliding angle of less than 10 degrees with respect to any hydrophilic flat surface. Further, the article according to the present disclosure has elasticity, and may have a high degree of elasticity which may be stretched and subsequently relaxed up to 1,000% or more. Further, as the hydrophobicity (or superhydrophobicity) and elasticity are very stable in the article according to the present disclosure, the article according to the present disclosure stably exhibits elasticity and superhydrophobicity even after 1,000 repeated stretching-relaxation cycles under 1,000% strain as it can be seen from subsequent experiment results.

Hereinafter, the present disclosure will be described more in detail through specific Examples according to the present disclosure.

EXAMPLES

[Manufacturing of Surface-Modified Silica Nanoparticles]

Silica nanoparticles were synthesized by adding TEOS (99.999%) (Sigma-Aldrich product of Korean materials) to a basic solution containing water and ammonia, and hydrolyzing and condensing the TEOS added to the basic solution. The synthesized silica nanoparticles were centrifuged and washed, and then re-dispersed in ethanol. In accordance with the procedures stated in the aforementioned non-patent document 14, the silica nanoparticles were surface-modified using trimethoxy(octadecyl)silane (90%) (Sigma-Aldrich product of Korean materials) such that surfaces of the silica nanoparticles include an octadecyl chain. The surface-modified silica nanoparticles were centrifuged, washed, and dried at room temperature to manufacture silica nanoparticles. The manufactured silica nanoparticles were observed by SEM, average sizes of the silica nanoparticles were measured through SEM and dynamic light scattering (DLS), and the measured average sizes of the silica nanoparticles were 550 nm (refer to FIG. 2).

[Manufacturing of a Fiber and a Fiber Mat]

A solution was prepared by adding a styrene-butadiene-styrene (SBS) block copolymer (KRATON® D1102 J polymer; polystyrene content 31%; KRAON Corporation product of American materials) to a solvent mixture (DMF/THF 3:7 vol/vol %) of N,N-dimethylformamide (DMF)/tetrahydrofuran (THF) (DMF: A 99.8%, Sigma-Aldrich product of Korean materials) (THF: 99.5%, Samchun Chemicals product of Korean materials) at a concentration of 15 wt/vol %. After stirring the solution for 2 hours, the dried silica nanoparticles were added to the solution in an amount corresponding to 10 wt/wt % of silica nanoparticles with respect to SBS. Self-aggregation of the silica nanoparticles was prevented by sonicating the solution for 30 minutes while stirring the solution at room temperature. Thereafter, the aforementioned composite solution was introduced into an electrospinning device (NanoNC product, Korea). In order to perform an electrospinning process, the solution was supplied to a syringe (5 mL) using a stainless-steel needle (27 Ga), a high voltage (20.0 kV) was applied, and a flow rate was fixed to 50 µL min$^{-1}$. An average temperature was 15° C., and humidity of an electrospinning chamber was maintained to 16 to 18%. A distance from a tip to a substrate (4 inch silicon wafer) was 17 cm. A mat which had been intactly spun was slowly exfoliated from the substrate so as to use the exfoliated mat in the future.

In FIG. 3, FIG. 3A shows a fiber which has been intactly spun, the fiber having silica nanoparticles (SiNP) included therein (hereinafter, the fiber is referred to as SBS/SiNP). A bright zone in an SEM image shows SiNP. Existence of SiNP was confirmed by firing the fiber. Residues were clearly observed as granules as an organic polymer was decomposed and removed in the air, and this means that inorganic SiNP was remained after firing the fiber (FIG. 3B). The location of SiNP corresponded to that of the fiber before performing the firing process.

[Subsequent Surface Modification]

After preparing a solution containing 0.5 mL of 1H, 1H, 2H, 2H-perfluorodecyltriethoxysilane (FDTS) (97%) (Sigma-Aldrich product of Korean materials) in 10 mL of a solvent, the previously manufactured electrospun fiber mat was immersed in the solution for 2 minutes. Thereafter, a material loosely coupled to the fiber mat was removed from the fiber mat by taking out the fiber mat from the solution and lightly washing the fiber mat with the solvent used above. The fiber mat was vacuum dried for one hour. In order to perform a firing process, the fiber was maintained at 70° C. for one hour after putting the fiber into a muffle electric furnace (AID Engineering product, Korea), increasing temperature of the fiber to 500° C. at a rate of 10° C.min$^{-1}$, and leaving alone the temperature-increased fiber for 12 hours.

[Measuring and Comparing Characteristics]

Measurement and Comparison of Elasticity

Only a mat using a non-beaded fiber having an average diameter of about 2 µm was selected as the above-manufactured electrospun fiber mat. A fiber mat having a thickness of 150 was manufactured in the present disclosure. An electrospun fiber mat of SBS and an electrospun fiber mat of SBS/SiNP which had been manufactured in accordance with the same procedures were compared to each other. Results obtained when applying strains of 0%, 100%, 300% and 500% to the mats are shown in FIG. 4. Bidirectional arrows in FIG. 4B and FIG. 4C indicate stretching directions.

As shown in FIG. 4A, the fiber mat of SBS or SBS/SiNP exhibits stable elasticity up to 1,000% strain. According to SEM analyses based on applied strains (FIG. 4B and FIG. 4C), when the mats are freely positioned at 0% strain, fibers are randomly piled up due to the electrospinning process, and these mats do not seem to be woven. At 300% strain, the fibers began to be arranged in a stretching direction. When the diameter of the fibers is larger than that of SiNP, most of SiNP is embedded in an SBS/SiNP fiber, and only a portion of SiNP appears on the surface of the fiber at 300% strain. However, when an applied strain is increased up to 500%, as a greater compressive force is generated in a direction perpendicular to the stretching direction, the diameter of the arranged fibers is reduced. In a free state, the SBS/SiNP fiber is measured to have an average diameter of 2.24±0.61 µm, and this value is reduced to 1.37±0.36 µm at 500% strain. Due to the Poisson effect of fibers in an SBS/SiNP mat, the fibers tend to be compressed in a direction perpendicular to the stretching direction. Therefore, more SiNP may be observed on surfaces of the fibers at 500% strain (FIG. 4C). Randomly aligned SBS fibers and SiNP which comes out from the fiber surfaces increase surface roughness, and this is important in achieving superhydrophobicity. As the fibers are randomly arranged at 0% strain, the surface of the mat is not even, and the mat has a high surface roughness accordingly. As the fibers are well arranged in a stretching direction under a high strain, most of the pores in the mat are disappeared or reduced. Although the number of pores (i.e., air pockets) is decreased, this may be compensated for by newly protruded SiNP. As a result, the surface roughness of the mat may be maintained. As an objective of the present disclosure is to manufacture a stretchable superhydrophobic fiber and a fiber mat, the above phenomenon is important.

Evaluating Effects on Surface Treatment by Fluoroalkylsilanization Depending on Solvents The following experiments were carried out to investigate effects on surface treatment depending on solvents used in a coupling agent solution when surface-treating an SBS/SiNP fiber by fluoroalkylsilanization.

The solvents were tested to find which solvent brings the highest hydrophobicity by dissolving FDTS in various solvents (4.7 vol/vol %). Acetonitrile (ACN), methanol, 1-propanol, 2-butanol, 1-octanol, and 3-methoxy-3-methyl-1-butanol were used as the solvents. A fiber mat was produced by immersing an SBS/SiNP mat in a solution prepared by mixing the solvents with FDTS. The produced fiber mat was referred to as SBS/SiNP/FDTS.

Contact angles were measured in order to measure hydrophobicities. Specimens with a width of 10 mm, length of 30 mm and thickness of 150 μm were used, and a measurement process was performed by using a Drop Shape Analyzer, DSA30 model (a product of KRUSS GmbH, materials of Germany). A liquid drop of 5 μL was placed on the aforementioned surface so that volume of the liquid drop did not affect static contact angles. Sessile drop mode and Young Laplace method, which could adjust a contact angle range of 20 to 180 degrees, were used. Data were collected five times from different locations on the mat at each measurement.

After putting a water droplet of 5 μL on each of SBS/SiNP/FDTS samples, static contact angles of the water droplet were measured. The contact angles had changed to be highly dependent on solvents used in fluoroalkylsilanization (FAS) (FIG. 5A). The highest contact angle (>~150°) was obtained in a mat treated with ACN, and mats treated with other solvents exhibited contact angles less than 150 degrees. Since an SBS/SiNP sample before FDTS treatment generally exhibits contact angles close to 140 degrees, contact angles after FDTS treatment are thought to be affected by the solvents used.

Each of the SBS/SiNP/FDTS samples was additionally measured by SEM (FIG. 6). In case of mats treated with 1-octanol and 3-methoxy-3-methyl-1-butanol, surface areas of fibers were considerably increased, and swelling effects occurred during solvent adsorption. The total surface of the mats became somewhat smooth, the presence of pores or air pockets on the surface decreased, and hydrophobicity was lowered than before FDTS treatment as a result. By contrast, ACN treatment did not affect fiber dimensions, and contact angles of the samples were exhibited to be more than 150 degrees. The ACN treatment is important in the formation of a superhydrophobic surface. Only ACN was used as a solvent in a later experiment of evaluating characteristics.

With regard to FDTS treatment, a mat of SBS/SiNP, a mat of SBS/SiNP/FDTS, and a mat of FDTS alone were sequentially analyzed by attenuated total reflection (ATR) FT-IR (FIG. 5B). Peaks at 1645 cm$^{-1}$ and 1600 cm$^{-1}$ each indicate aliphatic and aromatic C=C stretching bends of SBS, and two peaks at 1494 cm$^{-1}$ and 1448 cm$^{-1}$ indicate C—H bend of SBS, in which these peaks are absent in an FDTS spectrum. Characteristic peaks of FDTS are located at 1202, 1148 and 1078 cm$^{-1}$, and these peaks indicate C—F stretches from $CF_3$ and $CF_2$. A spectrum of the SBS/SiNP/FDTS mat includes all characteristic peaks of SBS and FDTS. This confirms that FDTS is well coated and bonded onto the fiber mats even after performing a washing process and a vacuum drying process.

Test of Comparing Hydrophobicity and Elasticity of Fiber Mats

Five types of fiber mats were manufactured by using the following different components: SBS, SBS/SiNP, SBS/FDTS, and SBS/SiNP/FDTS. Water repellencies were measured by comparing water contact angles of these fiber mats. An SBS mat exhibited an average contact angle of 137 degrees, and this means that SBS itself is somewhat hydrophobic (FIG. 7A). An SBS/SiNP sample exhibited a contact angle of 143 degrees, this is a contact angle which is 6 degrees greater than SBS, and this is thought to be due to the functionalization of the surface of SiNP as a hydrophobic compound. After FDTS treatment, an SBS/SiNP/FDTS mat became superhydrophobic by having a contact angle of 156 degrees, and this indicates that the surface treatment of fluoroalkylsilanization was successful (FIG. 7B and FIG. 7C). An SBS/FDTS mat had a contact angle of 153 degrees, and this is a somewhat low contact angle compared to the SBS/SiNP/FDTS mat. This is because there is no SiNP.

Additionally, the effect of the absence of SiNP becomes more serious when the fiber mats are stretched. When the mats are stretched in a lateral direction, i.e., a long axis direction of specimens, all of the mats may be stretched up to 1,000%. An SBS/SiNP/FDTS sample maintained a contact angle of 154 degrees or more up to 1,000% strain (FIG. 7D). However, a contact angle of the SBS/FDTS mat was decreased gradually according as the strain increased. The contact angle was decreased up to 140 degrees at 1,000% strain, and this means that an SiNP-free mat may not maintain superhydrophobicity. In case of the SBS/SiNP/FDTS mat, surface roughness is increased as a greater number of SiNP portions are protruded from surfaces of fibers such that new irregularities are formed on the fiber surfaces when strain is increased on the fiber mat. The roughness contributes to the maintenance of superhydrophobicity in a high strain resultingly.

Further, sliding angles of the fiber mats under various strains were evaluated. In order to measure the sliding angles, the fiber mats were slowly tilted, and angles between the mats and the floor were recorded by a digital angle measuring instrument until water droplets began to roll down. Data were collected five times from different locations on the mats at each measurement.

Usually, a superhydrophobic surface is thought to indicate a sliding angle of less than 10 degrees. The smallest horizontal angles required for water droplets to roll were measured for SBS/FDTS, SBS/SiNP, and SBS/SiNP/FDTS samples. Further, different water droplet flows were observed on the surface when stretching direction follows a slope, i.e., when the stretching direction is a longitudinal direction and when the stretching direction is a perpendicular direction, i.e., a lateral direction (FIG. 8A). In FIG. 8B, the SBS/SiNP/FDTS mat according to a longitudinal direction indicates the smallest sliding angle of 7.8 degrees at 0% strain, and this value was maintained to less than 10 degrees although the strain was increased. When the strain was increased to 1,000%, a longitudinal sliding angle was slightly decreased such that the sliding angle became 5.8 degrees. A small sliding angle implies a meaning that a water droplet may easily roll off the surface, and this means that contamination on the surface is reduced as the corresponding surface has self-cleaning capability. However, a lateral sliding angle was found to be more than 10 degrees at 100% strain, and the lateral sliding angle was increased to approximately 14 degrees at a high strain. In case of the lateral direction, as the direction of a water droplet was perpendicular to the direction of stretched fibers, the water droplet passed along a groove produced by uniaxial stretching. Accordingly, the lateral sliding angle was made to be always greater than the longitudinal sliding angle. Particularly, SBS/SiNP/FDTS at 1,000% strain indicated a longitudinal sliding angle of 5.8 degrees and a lateral sliding angle of 13.9 degrees. However, electrospun fibers were initially stacked in a random direction, and water droplets could flow in a random direction at 0% strain accordingly. Therefore, droplet flows had a preferred direction with respect to the surface under stretching, and this means that sliding down in a longitudinal direction only is based on properties of a superhydrophobic surface.

However, both of SBS/FDTS and SBS/SiNP samples had sliding angles of more than 10 degrees regardless of strain levels except that an SBS/FDTS sample indicated longitudinal sliding angles of 9.0 and 9.4 degrees respectively at 600% and 800% strains (FIG. 9). These results indicate that both the existence of SiNP and the FAS process are factors required in obtaining superhydrophobicity. In case of the SBS/FDTS and SBS/SiNP mats, it seems that water droplets penetrate into the groove of the fiber mats such that contact angles of the water droplets are increased, and mobilities of the water droplets on the surface are reduced.

Mechanical and Chemical Durabilities

Regarding mechanical durabilities of fiber mats, a test process was performed by repeating the stretching-relaxation cycle up to 1,000 times. An SBS/SiNP/FDTS mat was stretched to 1,000% and relaxed to 0% during each cycle, and a contact angle and a sliding angle were recorded every 50 cycles. After the 1,000th cycle, the mat indicated a contact angle of 156.3 degrees and a sliding angle of 6.3 degrees. When comparing the contact angle and the sliding angle with initial values, differences therebetween were insignificant (FIG. 10). The results, even after cyclic deformation, demonstrate that the SBS/SiNP/FDTS mat has excellent stability and reproducibility in its superhydrophobicity.

It is important to know whether superhydrophobic properties of fiber mats are maintained even in harsh conditions. To carry out a chemical durability test, the SBS/SiNP/FDTS mat was immersed in seawater, corrosivity liquid such as acid (pH=1), and a basic solution (pH=12) for one day. After rinsing the immersed SBS/SiNP/FDTS mats and drying the rinsed SBS/SiNP/FDTS mats, contact angles of the dried SBS/SiNP/FDTS mats at 0% and 1,000% strains were measured to obtain the measured contact angles of more than about 150 degrees (FIG. 11A). Further, each of the fiber mats was analyzed with FT-IR to examine a characteristic peak difference (FIG. 11B). As a result, all important peaks were the same as peaks of original fiber mats (FIG. 5B), and this represents that the chemical conditions did not affect molecular structure of the fiber mats. Namely, as a result of the above observation, there is no deterioration in the superhydrophobicity of the fiber mats.

What is claimed is:

1. A fiber for manufacturing a stretchable and superhydrophobic fiber article, the fiber comprising silica nanoparticles which are surface-modified such that the silica nanoparticles include a hydrocarbon chain, and a styrene-based thermoplastic elastomer,
   wherein at least some of the silica nanoparticles are included in the fiber, the surface is treated to comprise a fluoroalkyl group, and
   wherein the article has a contact angle of more than 150 degrees and a longitudinal sliding angle of less than 10 degrees with respect to any hydrophilic flat surface, and the contact angle and sliding angle are within the aforementioned numerical value ranges even under 500% strain or more.

2. The fiber for manufacturing a stretchable and superhydrophobic fiber article of claim 1, wherein the styrene-based thermoplastic elastomer is a linear styrene-based block copolymer.

3. The fiber for manufacturing a stretchable and superhydrophobic fiber article of claim 1, wherein the hydrocarbon chain is a linear or branched aliphatic hydrocarbon chain having 1 to 30 carbon atoms.

4. A stretchable and superhydrophobic fiber article comprising at least two of the fiber according to claim 1.

* * * * *

UNITED STATES PATENT AND TRADEMARK OFFICE
CERTIFICATE OF CORRECTION

PATENT NO. : 11,713,543 B2  
APPLICATION NO. : 17/006337  
DATED : August 1, 2023  
INVENTOR(S) : Jung Kyun Im et al.

Page 1 of 1

It is certified that error appears in the above-identified patent and that said Letters Patent is hereby corrected as shown below:

On the Title Page

Item (30) insert:
--Foreign Application Priority Data
August 30, 2019 (KR) 10-2019-0107036--

Signed and Sealed this
Twentieth Day of August, 2024

Katherine Kelly Vidal
*Director of the United States Patent and Trademark Office*